JAMES E. NORTH.

Improvement in Washing Machines.

No. 124,651.  Patented March 12, 1872.

Witnesses.
H. H. Young
Chas. E. Upperman

Inventor.
James E. North
By his Attorney,
J. N. Upperman

124,651

UNITED STATES PATENT OFFICE.

JAMES E. NORTH, OF OWEGO, NEW YORK.

IMPROVEMENT IN WASHING-MACHINES.

Specification forming part of Letters Patent No. 124,651, dated March 12, 1872.

*To all whom it may concern:*

Be it known that I, JAMES E. NORTH, of Owego, in the county of Tioga and State of New York, have invented certain new and useful Improvements in Washing-Machines; and I do hereby declare that the following is a full, clear, and exact description thereof, reference being had to the accompanying drawing and to the letters of reference marked thereon.

Figure 1:
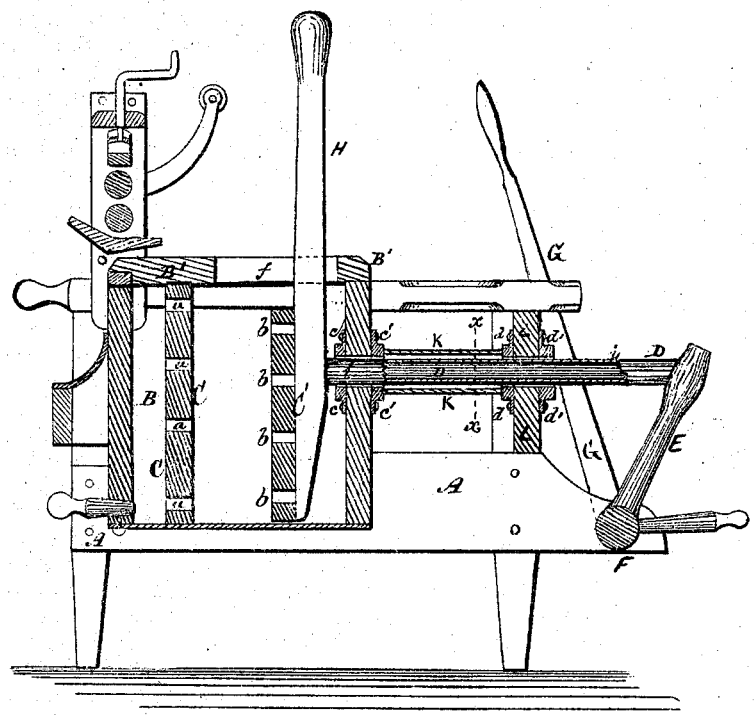
Figure 2:
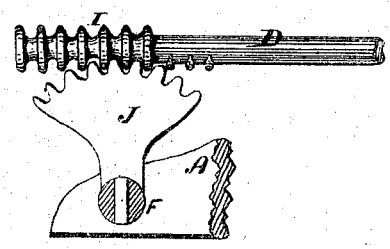
Figure 3:

Figure 1 is a central longitudinal section through a machine embracing my improvements. Fig. 2 represents a modification of the feeding apparatus. Fig. 3 is a transverse vertical section in the line $x\ x$ of Fig. 1.

My invention relates to certain specified improvements in the construction of my washing-machine patented February 23, 1864, and numbered 41,716; and consists, first, in providing both the stationary and movable rubber boards with apertures in lieu of the cavities heretofore used, thereby causing said boards to take a firmer hold upon the clothes, and consequently lessen the labor of operating the hand-lever; second, in employing a cylindrical casing for the rod or shaft attached to the movable rubber board, sufficiently large to permit the waste water drawn therein by the backward movement of said shaft to pass back through the casing into the tub, and, at the same time, afford a vacuum around the piston-rod for the circulation of air, which insures the proper drying of the rod and its bearings when the machine is not in use, the rubber rod being arranged to move in metallic bearings secured to the inside and outside of the machine, so that the shaft when moved will only impinge upon the annular surface of said bearings, thereby greatly decreasing its friction; third, the metallic covering or case for the movable rubber shaft, made, by preference, of zinc, though I contemplate using any metal for that purpose, in order to have metal on said shaft brought in contact with the metal bearings throughout that part of the rubber shaft which moves within the annular bearings secured to the inside and outside of the machine; metallic ferrules or rings secured thereon to be considered as embraced in this feature of my invention.

The main frame A constitutes the support for the tub B, which, through preference, is nearly semi-cylindrical in form, and closed at the top by means of a wooden lid, B', provided with a longitudinal slot, $f$, for the lever H to move in. The stationary rubber board C is secured within the tub B, and is provided with a suitable number of orifices, $a$, which form suction-cells for effectually retaining a hold upon the clothes when washing. Said rubber board is designed to act conjointly with a movable rubber board, C', likewise furnished with orifices $b$ similar to those described as constituting part of rubber board C', and used for the same purpose. The rubber board C' is furnished with a horizontal shaft or piston-rod, terminating at one end in a crank-arm, E, which is secured to the transverse rock-shaft F, which latter, connecting with the hand-lever G, enables the operator to impart the required backward and forward motion to the rubber board C'. Convenient to the hand-lever G is a vertical handle, H, secured to the movable rubber board C'. Thus the operator can impart with one hand the required motion to the hand-lever G, and with the other hand operate the handle H to vary the position or angle of inclination of the rubber board. I contemplate, as illustrated in Fig. 2 of the drawing, having the piston-rod D furnished on one end with a toothed or rack surface, I, which, fitting into a toothed segment, J, would enable the operator to give the rod D a movement in a more direct line with the plane of its bearings. On the inside and outside of the machine is secured the annular castings $c\ c'$, which form the bearings for the horizontal piston-rod D to move in. Similar bearings, $d\ d'$, secured on the cross-board or head-block L, serve to give the required plane for the said rod D to move in, thus reducing the bearing-surfaces of the rod D to the distance it traverses within said journals or bearings $c\ c'$ and $d\ d'$. Interposed between the journals $c'$ and $d'$ is a cylindrical case, K, encircling the piston-rod D. Thus the waste water, which may be drawn within the opening in the tub B through which the piston works, is caught and returned to the tub. The annular space formed by the difference between the diameter of the rod D and interior of the cylinder is designed not only to afford ample room for the passage of the rod D, but also to constitute an air-chamber for assisting in drying the rod D and the interior of its cylindrical casing K, as shown in Fig. 3. For durability, and to have a metal surface on the rod D opposed to the metal bearings $c\ c'$ and $d\ d'$, I furnish the said rod D with a metallic jacket, $i$, as shown in Figs. 1 and 3, though, as previously stated, metallic ferrules secured on the rod D at the required distance apart would subserve the same purpose, and I contemplate using them when desired.

The main frame of my machine is so arranged as that I can combine therewith a suitable device for wringing the clothes, though as this constitutes no feature of my invention and it is optional which wringing apparatus I may use, I deem it unnecessary to describe it in detail, and therefore have merely shown in my drawing one form of wringer.

Operation.

The tub B being supplied with the required quantity of water and the clothes placed therein, the lid B' is placed in position over the top of said tub, and the rubber boards are compressed, as desired, by means of the lever G. While thus held between said rubber boards a reciprocating motion is given to the movable rubber C' by the lever H, thus causing a partial vacuum by reason of the openings $a$ and $b$ permitting the clothes to cling to the surface of the rubber boards, so that the reciprocal motion of the rubber board C' rubs the clothes together against each other in lieu of rubbing them directly against the surfaces of the boards C C', thus avoiding the friction consequent thereby, and saving the clothes from the injury they sustain where rubbed directly against rubber boards having either fluted or corrugated surfaces.

Having described my invention, I claim—

1. In combination with the tub B and movable lid B', the rubber boards C C' having orifices $a\ b$, operating as described, and employed in connection with the rod D, rock-shaft F, and levers G H, substantially as and for the purposes herein described.

2. I claim the cylindrical case K, employed in combination with the rod D and bearings $c\ c'$ and $d\ d'$, in the manner and for the purpose herein specified.

3. In combination with the subject-matter of the foregoing clauses, I claim the metallic jacket or case $i$, encircling the shaft D, as and for the purposes herein set forth.

In testimony whereof I have hereunto signed my name.

JAMES E. NORTH.

Witnesses:
S. R. PARMELE,
T. J. JOHNSON.